Jan. 17, 1967  N. A. PIERSON  3,298,821
AEROBIC COMPOSTING WITH COMMINUTION AND FORCED AERATION
Filed March 26, 1964  11 Sheets-Sheet 2

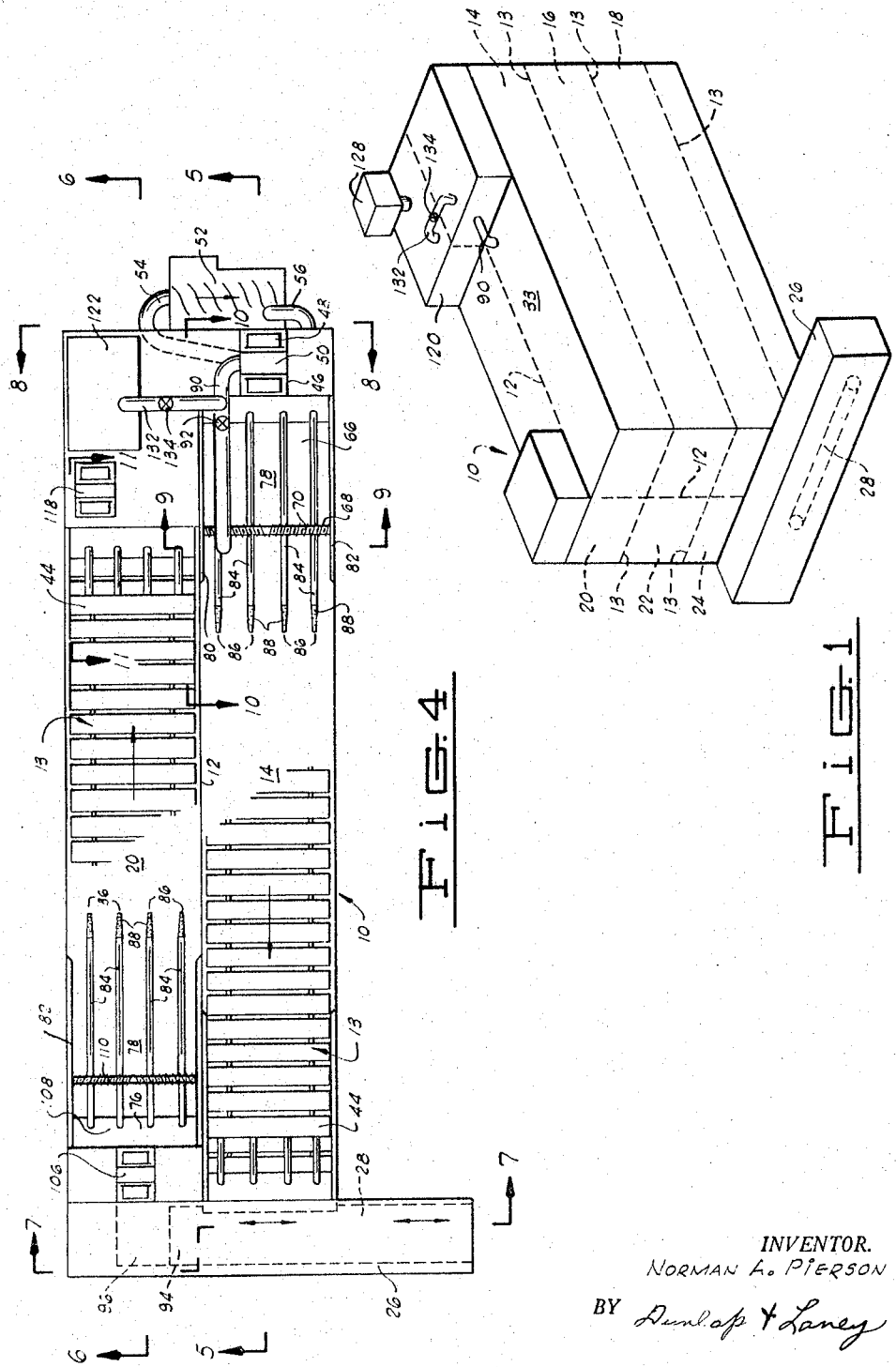

INVENTOR.
NORMAN A. PIERSON
BY Dunlap & Laney
ATTORNEYS

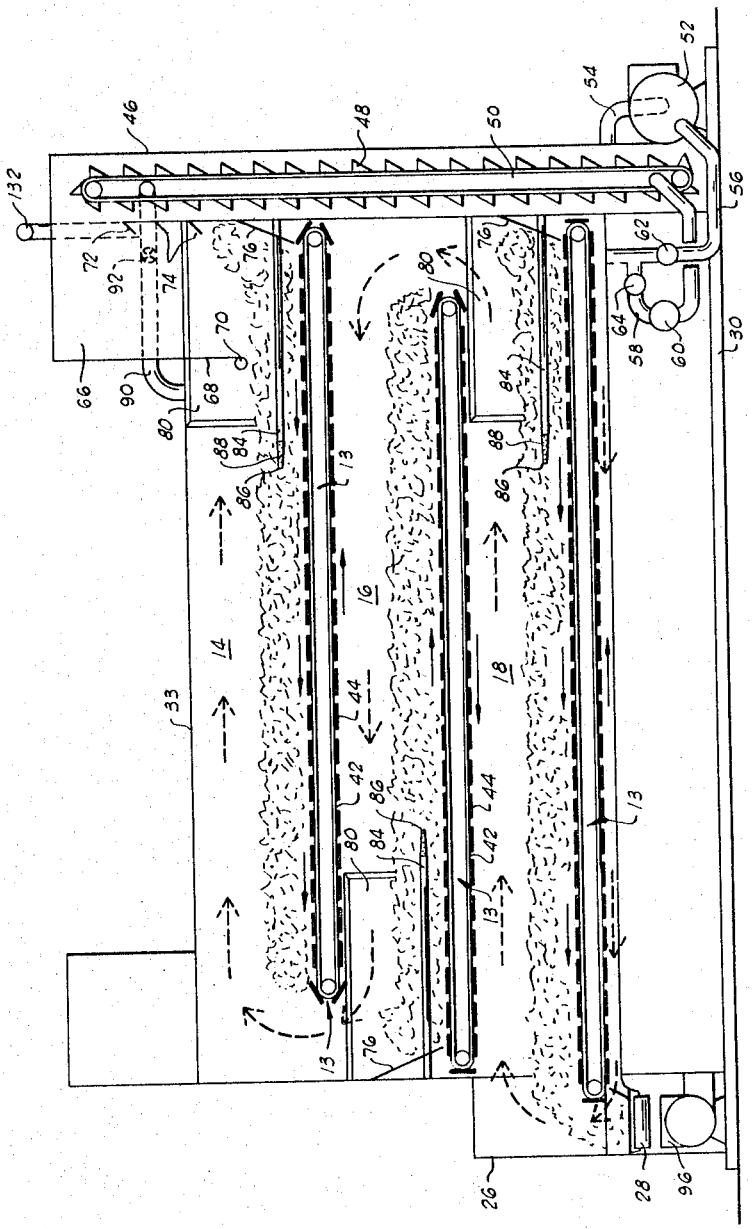

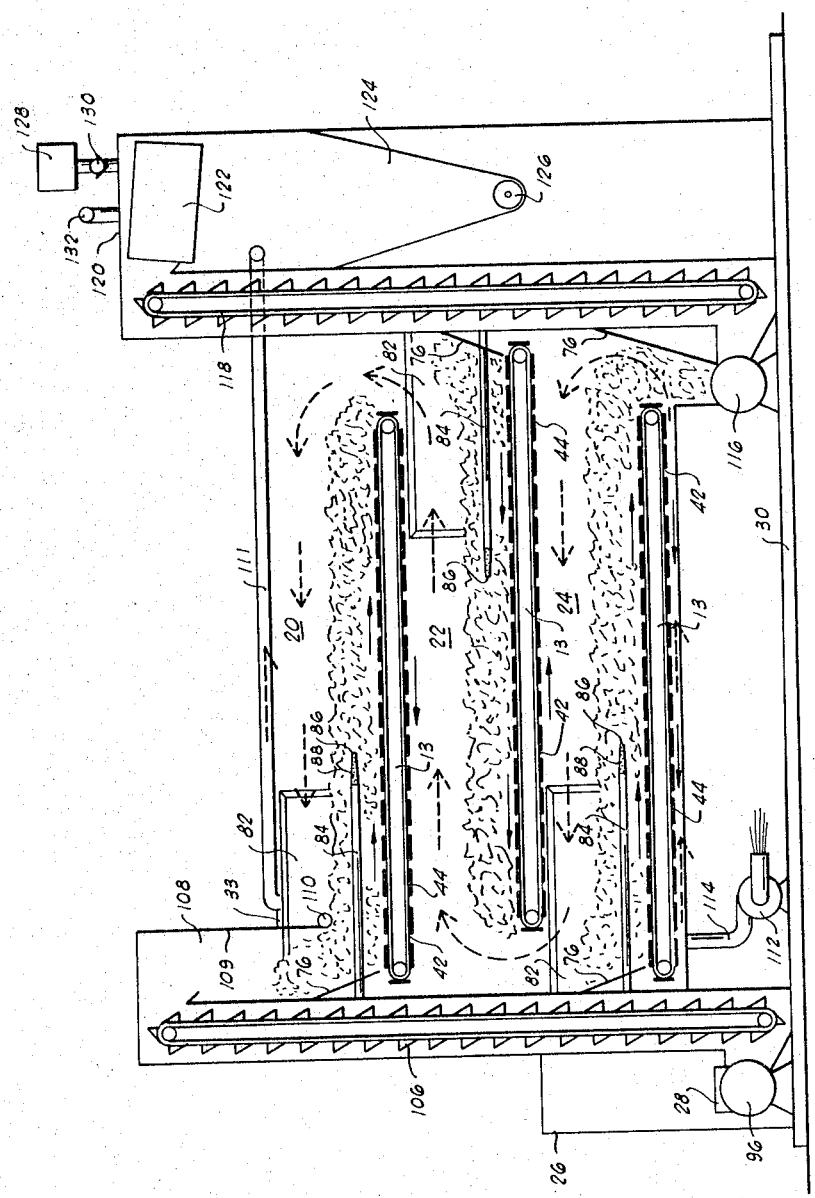

Jan. 17, 1967   N. A. PIERSON   3,298,821
AEROBIC COMPOSTING WITH COMMINUTION AND FORCED AERATION
Filed March 26, 1964                                    11 Sheets-Sheet 5
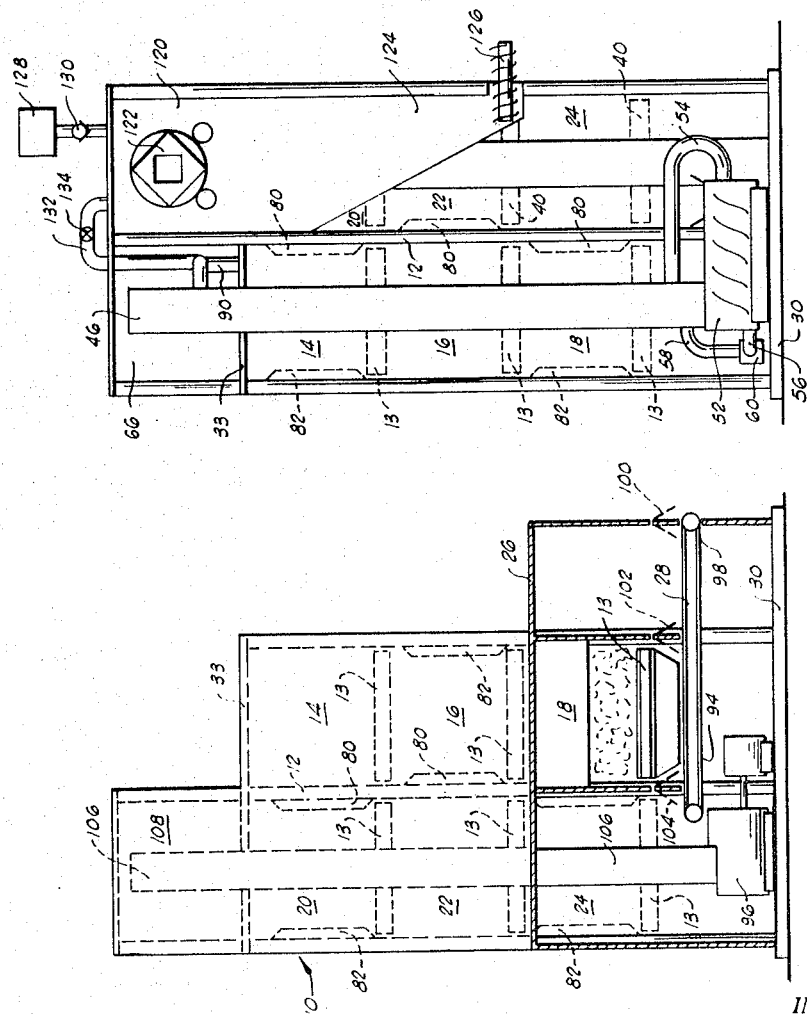
INVENTOR.
NORMAN A. PIERSON
BY Dunlap & Laney
ATTORNEYS

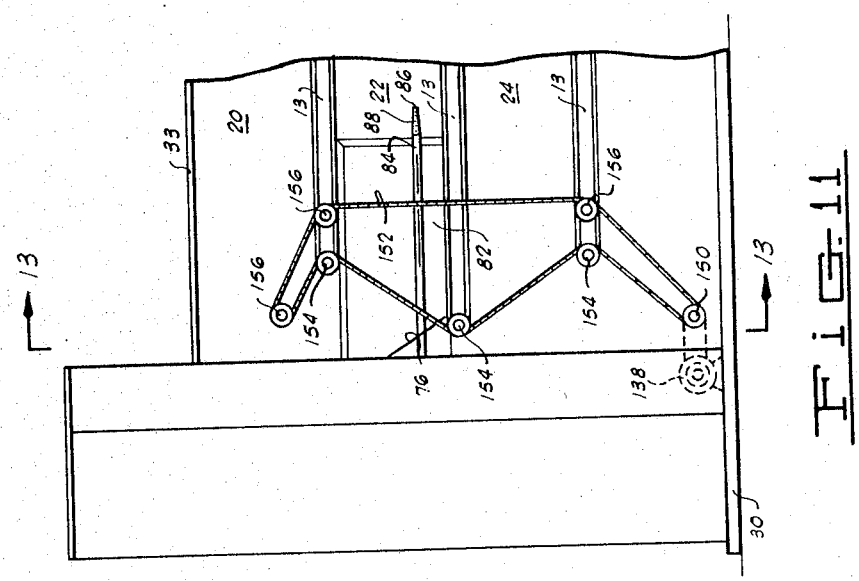
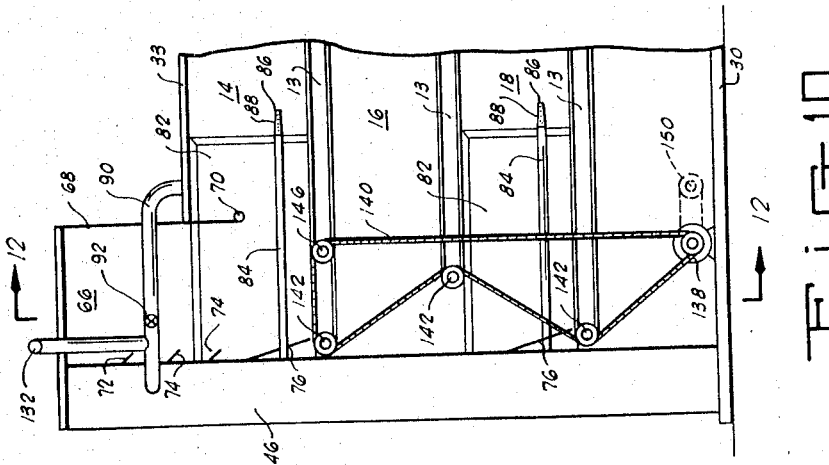

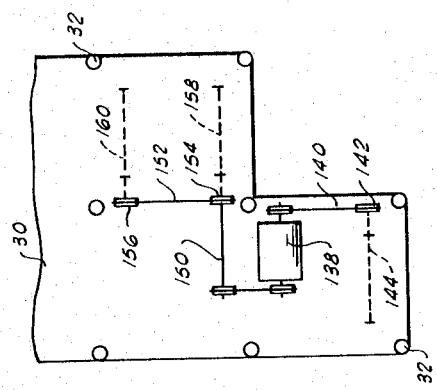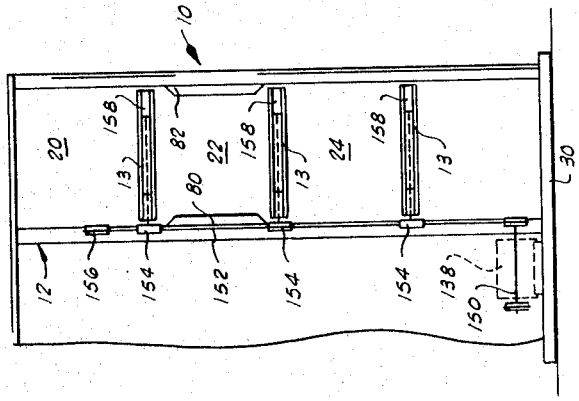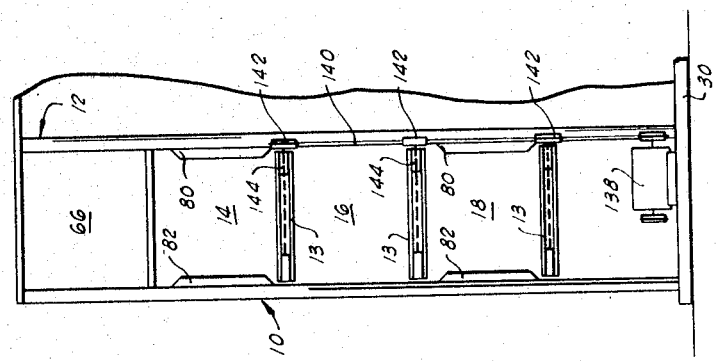

INVENTOR.
NORMAN A. PIERSON
BY Dunlap & Laney
ATTORNEYS

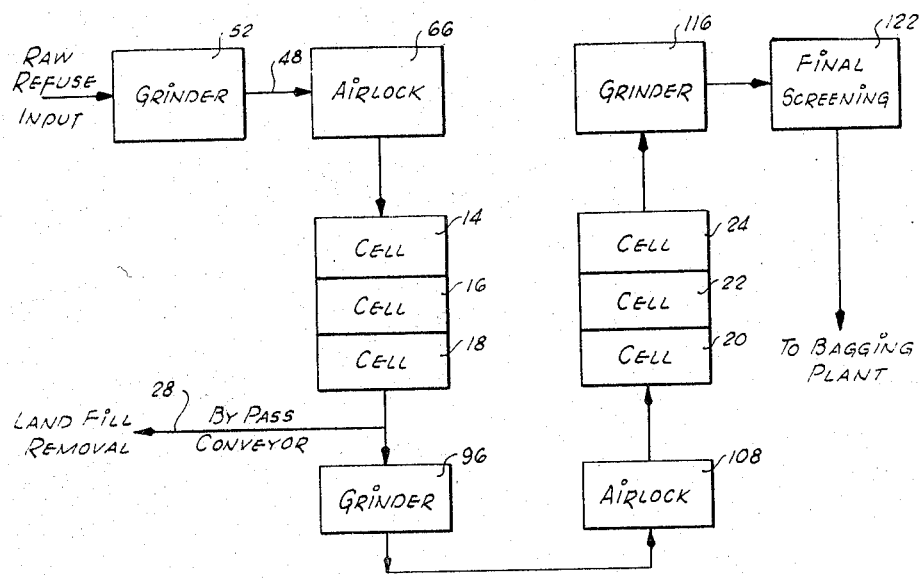
Fig. 17
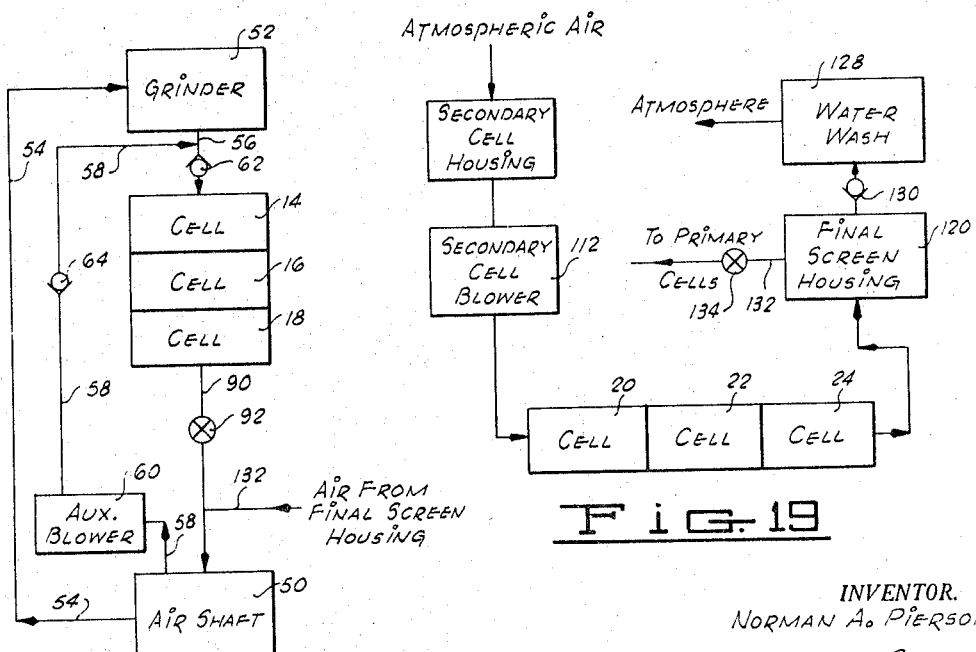
Fig. 18
Fig. 19
INVENTOR.
NORMAN A. PIERSON
BY Dunlap & Laney
ATTORNEYS

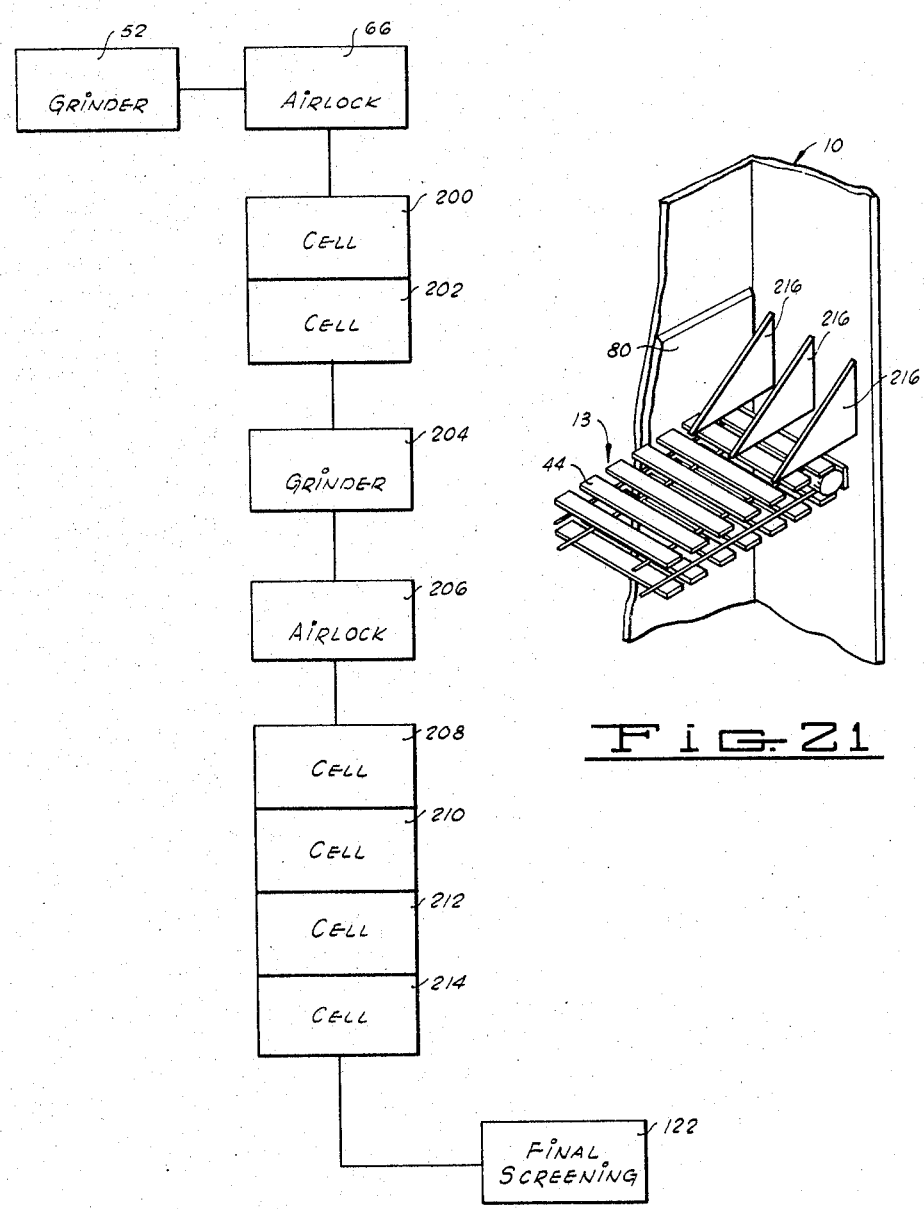

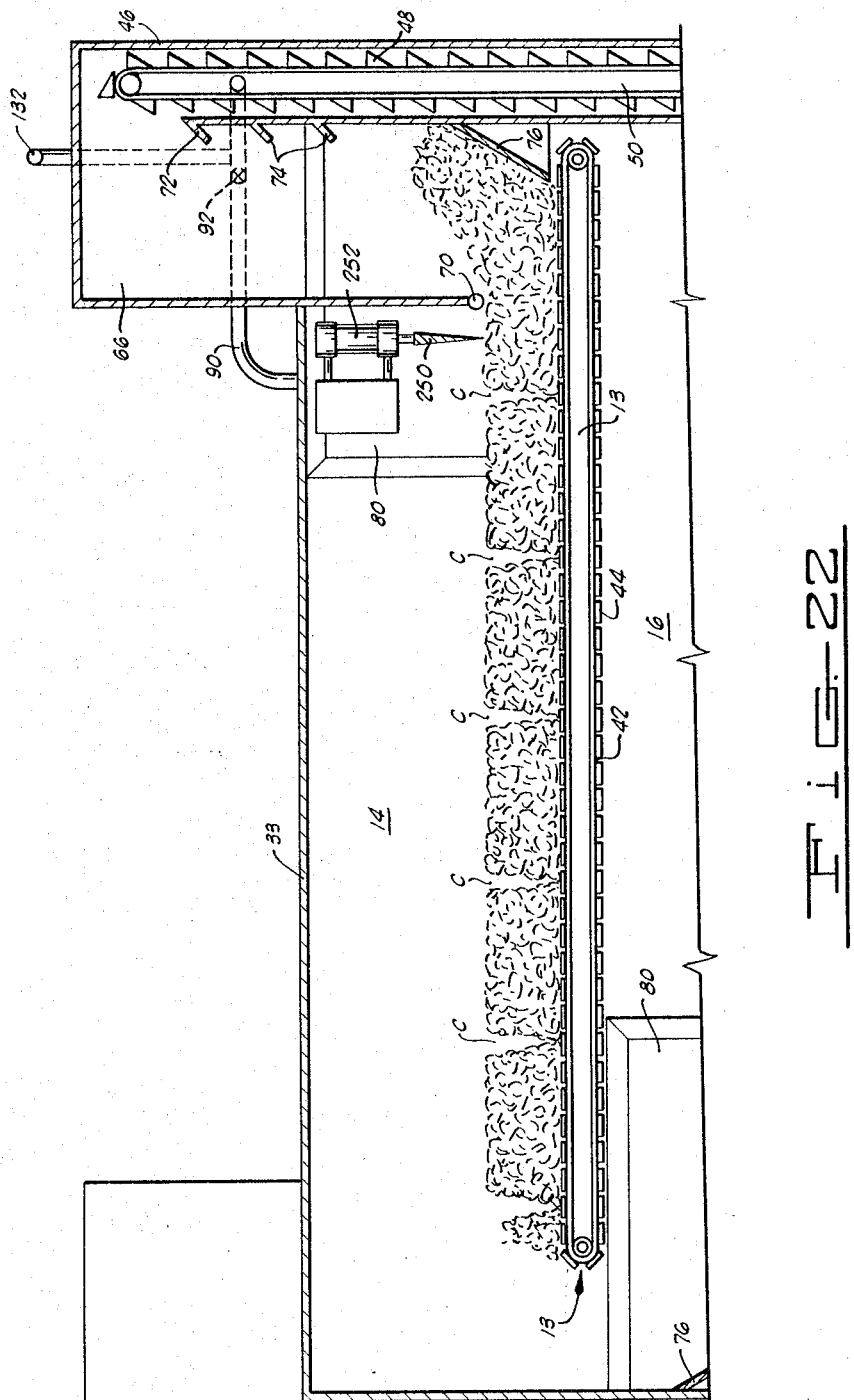

United States Patent Office 3,298,821
Patented Jan. 17, 1967

3,298,821
AEROBIC COMPOSTING WITH COMMINUTION
AND FORCED AERATION
Norman A. Pierson, P.O. Box 755,
Norman, Okla. 73069
Filed Mar. 26, 1964, Ser. No. 357,344
13 Claims. (Cl. 71—9)

This application is a continuation-in-part of application No. 93,393 filed March 6, 1961, now abandoned.

This invention relates to a method and apparatus for decomposing waste material to produce a useful compost. More particularly, but not by way of limitation, the present invention relates to a method and apparatus for converting organic waste material of the type found in municipal refuse and the like to a stabilized compost having utility as a soil nutrient.

The biological decomposition of organic matter by various types of microorganisms which occurs in nature is familiar to everyone and is as old as nature itself. The end product of such decomposition is frequently a stable material which is useful in supporting life by virtue of its soil nutrient properties. In relatively recent times, attempts have been by man to duplicate the natural processes of decomposition, for such decomposition presents an ideal solution to the problem of usefully disposing of the large amounts of unhealthful organic waster materials which are products of man's existence. An example of this problem in one of its most concerning forms is the need to find a healthful and useful way of disposing of the huge amounts of refuse which are constantly accumulated in modern municipalities.

Although numerous attempts have been made to successfully applying the process of bacterial decomposition to municipal refuse on a practical commercial scale, none of such attempts have enjoyed success of any magnitude as evidenced by the fact that the vast majority of the cities in this country still dispose of municipal refuse by burying it or by subjecting it to incineration. Not only do the latter processes constitute a financial liability to the municipality, but they also are not a complete answer to the sanitation problem, since various odors and unhealthful air pollution result from incineration, and since the burial process allows the refuse to be exposed long enough to become infested with disease-carrying vermin.

There are at least three major reasons why biological decomposition of municipal refuse, which will hereinafter be termed "composting," has not been widely accepted as a means of disposing of such refuse. First, the time required to convert the refuse to a useful, or at least safe, final product has been of such duration that cities producing large volumes of such refuse have not found it practical to attempt to dispose of refuse in this manner. In some cases the treatment of the refuse with microorganisms to effect its decomposition and stabilization in a useful product has required more than a month. Secondly, the process of biological decomposition has all too frequently been accompanied by the evolution of noxious gases, or at least gases having a very undesirable odor. Although it is well known that these obnoxious gases are products of the putrefaction of organic matter by the type of bacteria which are characterized as anaerobic bacteria (that is, those which reproduce and thrive in the absence of oxygen), the composting processes thus far utilized have not, as a rule, enjoyed a high degree of success in suppressing anaerobic bacterial action and in promoting the substantially odorless oxidative action of aerobic bacteria.

A third reason for the previous lack of widespread acceptance of composting as a means of disposing of municipal refuse has been the failure of many of such processes to yield a completely stable and innocuous product. Although it is known that the pathogens and most of the anaerobic bacteria in organic waste material can be destroyed by elevating the temperature of the refuse above the pasteurization temperature of 141° F., this treatment alone has not been effective to prevent some further anaerobic bacterial activity or to prevent continuing aerobic bacterial activity. The former condition is, as has been explained, detrimental for the reason that such activity is accompanied by the evolution of obnoxious odors. On the other hand, continuing aerobic bacterial activity is likewise undesirable in the final product for the reason that the nutrient value of the compost may be exhausted prior to its use upon the soil and also because the active aerobic bacteria attack and destroy such packaging materials as paper bags and the like.

In an effort to avoid instability in the final product of the composting process, it has been proposed to aerate the waste material in a controlled manner and then reduce the moisture content of the mass of composted material to below a level at which the aerobic bacteria are active. In general, however, such stability of product as is obtained in this manner is realized at the sacrifice of time required to completely compost and stabilize the refuse so that the solution of one of the problems only results in the aggravation of another.

I believe the failure of prior efforts to compost municipal refuse in a rapid and efficient manner has been due in large part of a lack of recognition of the agglomerating characteristic of this type of waste material and, more particularly, the effect of this agglomerating characteristic upon proper aeration of the refuse. I have observed that the tendency of partially composted municipal refuse to agglomerate or cohere is such that the refuse will bridge a space of approximately nine feet when supported at each of its ends. The agglomeration and packing of the refuse in the manner described make it extremely difficult to properly aerate the center of the mass so as to suppress anaerobic bacterial activity and promote the desirable aerobic decomposition. Moreover, although the presence and growth of beneficial fungi in the composting refuse is highly desirable, optimum growth of these organisms can only be promoted by periodically completely turning the refuse so as to expose new areas to the fungi. The apparatus and techniques used to accomplish this turning in prior systems for composting refuse have not been designed with proper consideration and weight assigned to the agglomerating property of municipal refuse. Thus, sifting screens have been clogged, the moving parts of machinery are also partially clogged, and the turning and agitation achieved are insufficient to assure efficient aeration of the entire mass and rapid growth of beneficial fungi. I have discovered that the cohesive properties of comminuted municipal refuse may actually be made the basis for a highly efficient system for aerating and controlling the temperature of the refuse in a manner best calculated to promote and accelerate aerobic bacterial activity and the growth of beneficial fungi. A fortiori, this aeration and temperature control effectively suppress the activity of anaerobic bacteria so as to prevent the generation of obnoxious odors and most of the anaerobic bacteria are destroyed during the process. The agglomerated mass is totally exposed on three of its sides and is also largely exposed upon its fourth side to gently moving, moist, warm air which is continually recirculated around the mass in the initial stages of the digestion process. This recirculation has the effect of blending the gases produced by the aerobic bacteria in various parts of the mass of refuse so that a uniform ratio of carbon to nitrogen exists in the entire composting environment.

This uniformity of the C/N (carbon to nitrogen) ratio has been found to promote and accelerate aerobic bacterial action.

I have also found that the forces of cohesion acting in comminuted municipal refuse are such that by imposing forces of appropriate magnitude and location upon the agglomerated mass of refuse, the mass may be cracked or split apart at appropriate intervals to thereby expose a greater surface area of the refuse to the recirculated air referred to above. The apparatus which has been designed to achieve the cracking or splitting of the mass of refuse is believed to be highly novel and is yet very simple and quite effective. Less preferred, and more conventional apparatus may also be used to form the cracks in the agglomerated mass, the primary criteria being that the cracks extend vertically into the mass of refuse and extend transversely across the mass of refuse.

The present invention further presents a new concept in the area of constant and beneficial control of temperature and aeration during all stages of bacterial digestion of organic waste material which has proved to be especially effective in the process of composting municipal refuse. The constant recirculation of warm, moist air in the early stages of the digestive process has already been referred to above. Not only has this recirculation the beneficial effect of evening the C/N ratio in the initial digestive stages, but by gently recirculating the air around the mass of refuse, the spores, fungi and bacteria in the air adjacent the refuse are conserved rather than being lost to the atmosphere, etc.

In the later and final stages of the digestive process, fresh, relatively dry air is circulated through the substantially completely composted refuse to dry the compost to the desired moisture content and stabilize aerobic bacterial activity in the final product. This air is then allowed to percolate through the screen utilized to classify the final product according to particle size, thereby becoming laden with aerobic bacteria, spores and beneficial fungi from the final product.

The fresh air which is passed through the refuse in the later stages of the digestive process is not so warm as the temperature which will be attained by the air which is recirculated in the early stages of digestion. In order to prevent the temperature of the refuse in the early digestive stages from rising above an optimum value, some of the air which has been percolated through the final product screen may be passed into the stream of air which is being recirculated in the early digestive stages. This has the advantage of maintaining temperature control without the introduction of a cold blast of atmospheric air into the primary digestive stages, thereby inhibiting bacterial activity. Moreover, the desirable bacteria and fungi are conserved in that these organisms are carried by the air from the final screen into the air recirculated in the initial stages of digestion.

The composting apparatus of the present invention is not only unique in providing a relatively simple mechanism for cracking and honeycombing the agglomerated refuse, but also in providing a compact unit containing a series of digestion cells in which near ideal conditions of aeration and temperature may be realized. In a preferred embodiment, the cells are arranged in two tiers of three vertically spaced cells, and the complete conversion of raw refuse to useful compost may be accomplished in six days or less. The refuse is moved on horizontal conveyors through the several cells and the cells are horizontally staggered so that the refuse may fall from one conveyor to the next, being effectively turned during the transfer. The housing which encloses the two tiers of cells is of a novel construction which permits the heat generated by thermophilic bacterial action to be effectively used for heating the composting plant. The structural members used in the housing are also of special utility in their function as elements of a highly novel lubricating system which is utilized to lubricate the drive system and moving elements of the conveyors.

It is a major and broad object of the present invention to provide a system and method for converting organic waste material to a useful compost in an expedient, safe and highly efficient manner.

A further object of the invention is to provide a system and method for decomposing organic waste material by aerobic bacterial action wherein optimum conditions for aerobic bacterial activity are approached and anaerobic bacterial activity is suppressed.

Another object of this invention is the provision of apparatus for exposing a greater surface area of municipal refuse undergoing aerobic bacterial attack to circulating air.

Another object of this invention is the maintenance, in a refuse composting system, of a constant supply of properly conditioned air at all times during the composting process.

An additional object of the present invention is to conserve and utilize the heat generated in a thermophilic composting process.

Another object of the present invention is the conservation and utilization of useful microorganisms of the type used in aerobic bacterial decomposition processes.

A further object of the present invention is to provide a novel lubricating system particularly adapted for use in a composting plant.

Another object of the present invention is to promote an even distribution of carbon and nitrogen in the environment of a composting process so that the aerobic bacterial activity may proceed without inhibition.

An additional object of the present invention is to provide a very economical composting plant by utilizing some standard equipment for dual purposes and functions in the composting process.

A further object of the present invention is to provide a highly sanitary composting plant in which substantially no noxious or obnoxious gases are evolved, and all gases are cleansed of harmful microorganisms prior to being discharged to the atmosphere. The composting plant also attains a high standard of cleanliness and sanitation in that its construction provides minimum space for vermin, such as rats, to run or build nests.

Another object of the present invention is to provide a unitized, compact composting system in which advantage is taken of the characteristic shrinkage of organic waste material during aerobic bacterial decomposition to conserve space and expense of construction.

Yet another object of the present invention is to provide a novel process and apparatus for decomposing organic waste material to a useful compost which is efficient in operation, is relatively inexpensive to manufacture and which is characterized by a long and trouble-free operating life.

These objects and advantages will be more clearly understood, and other objects and advantages will become apparent upon reading the following disclosure in conjunction with a perusal of the accompanying drawings which illustrate my invention.

In the drawings:

FIGURE 1 is a perspective view of the housing which encloses the composting system of the present invention. The location and arrangement of the several digester cells within the housing are illustrated in dashed lines.

FIGURE 4 is a schematic plan view of the composting system with the top of the housing removed to show various operational elements of the system.

FIGURE 5 is a vertical sectional view taken along line 5—5 of FIG. 4 and showing the primary digestion cells and the conveyor system for moving refuse therethrough.

FIGURE 6 is a vertical sectional view through the secondary digestion cells of the composting system taken substantially along line 6—6 of FIG. 4.

FIGURE 7 is a vertical sectional view taken substantially along line 7—7 of FIG. 4 and illustrating in dashed lines the location of the several digestion cells and conveyors in the composting system.

FIGURE 8 is a vertical sectional view taken substantially along line 8—8 of FIG. 4 and showing in dashed lines the position of the several digestion cells and conveyors.

FIGURE 9 is a vertical sectional view taken substantially along line 9—9 of FIG. 4.

FIGURE 10 is a vertical sectional view taken substantially along line 10—10 of FIG. 4 and showing the drive system of the conveyors of the primary digestion cells.

FIGURE 11 is a vertical sectional view taken substantially along line 11—11 of FIG. 4 and showing the drive system of the conveyors of the secondary digestion cells.

FIGURE 12 is a sectional view taken substantially along line 12—12 of FIG. 10.

FIGURE 13 is a sectional view taken substantially along line 13—13 of FIG. 11.

FIGURE 14 is a plan view of the conveyor drive system.

FIGURE 17 is a schematic flow diagram illustrating the path of refuse subjected to bacterial decomposition in the composting system of the present invention.

FIGURE 18 is a schematic flow diagram illustrating the path of air directed through the tier of primary digestion cells of the present invention.

FIGURE 19 is a schematic flow diagram illustrating the path of flow of air directed through the tier of secondary digestion cells of the present invention.

FIGURE 20 is a schematic flow diagram illustrating the path of refuse which is subjected to bacterial decomposition in a composting plant having a slightly modified arrangement of its digestion cells and grinders.

FIGURE 21 is a detail view illustrating the arrangement of honeycombing plates in a modified embodiment of the present invention.

FIGURE 22 is a detail view illustrating another embodiment of apparatus which can be employed for forming vertical cracks in the compost in the digestion cells.

Figure 3:
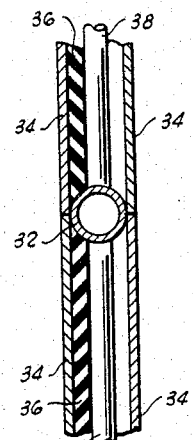
FIGURE 3 is a detail view in section, showing the double-walled construction of the housing.

Referring now to the drawings in detail and particularly to FIG. 1, reference character 10 generally designates a housing which encloses the composting system of the present invention. The housing 10 is divided into two adjacent compartments by a vertical longitudinal partition 12 located centrally in the housing 10. In a preferred embodiment of the invention, each of the compartments defined by the housing 10 and its longitudinal partition 12 is divided by three horizontal, vertically spaced conveyors 13 into three digestion cells in which the aerobic bacterial decomposition of waste material is carried out. The three digestions cells located in one of the compartments will be hereinafter termed the primary digestion cells and are designated by reference characters 14, 16 and 18 from the uppermost primary digestion cell to the lowermost primary digestion cell, respectively. The three vertically spaced digestion cells into which the second compartment is divided will be termed the secondary digestion cells and are designated by reference characters 20, 22 and 24 from the uppermost secondary digestion cell to the lowermost secondary digestion cell, respectively. An elongated rectangular housing 26 extends across one end of the housing 10 opposite the primary cell 18 and secondary cell 24 and encloses a by-pass conveyor 28 which functions to transfer partially composted refuse from primary cell 18 to the tier of secondary cells in a manner hereinafter more fully described.

Figure 2:
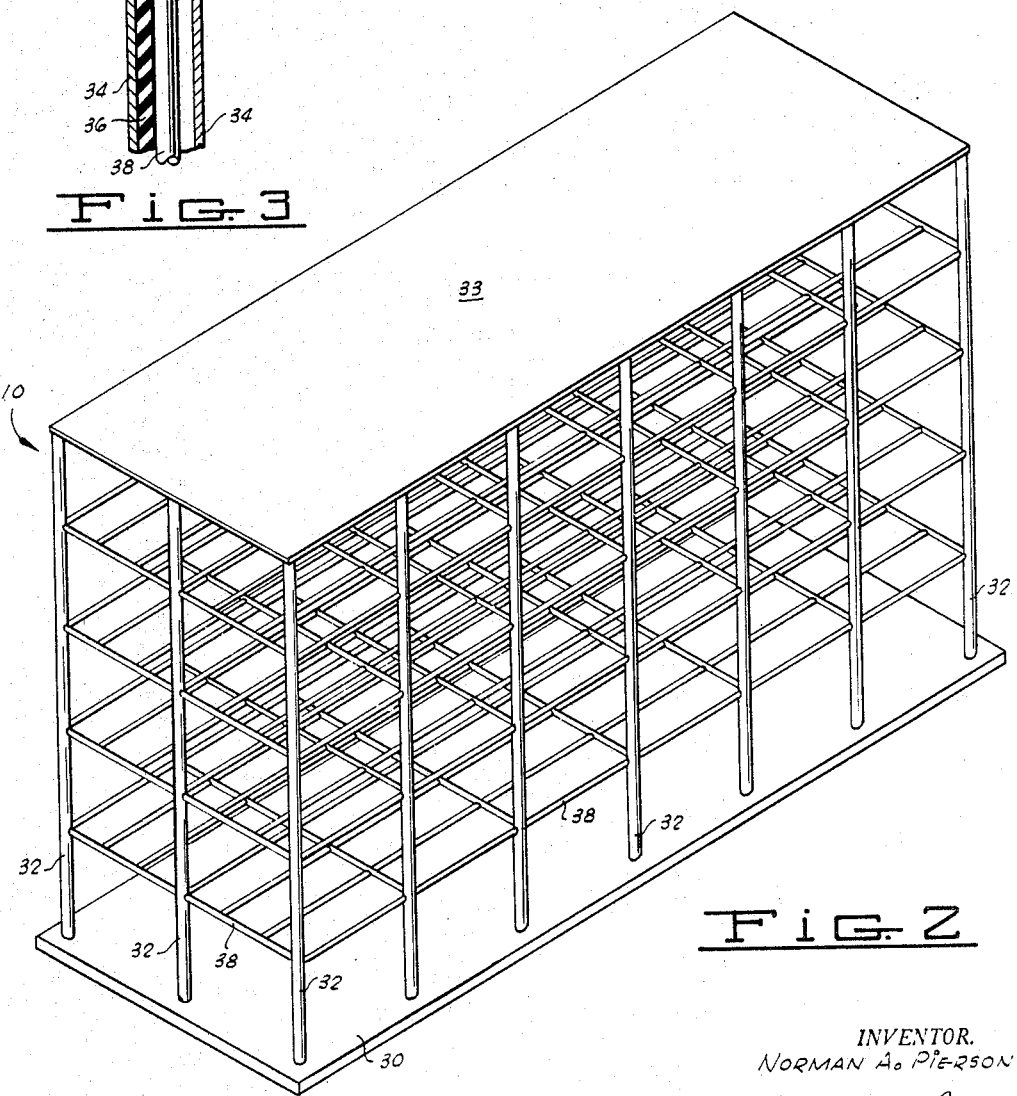
FIGURE 2 is a perspective view of the main portion of the housing shown in FIG. 1, and illustrates the appearance of the main structural members of the housing with the sides of the housing removed.
Figure 15:
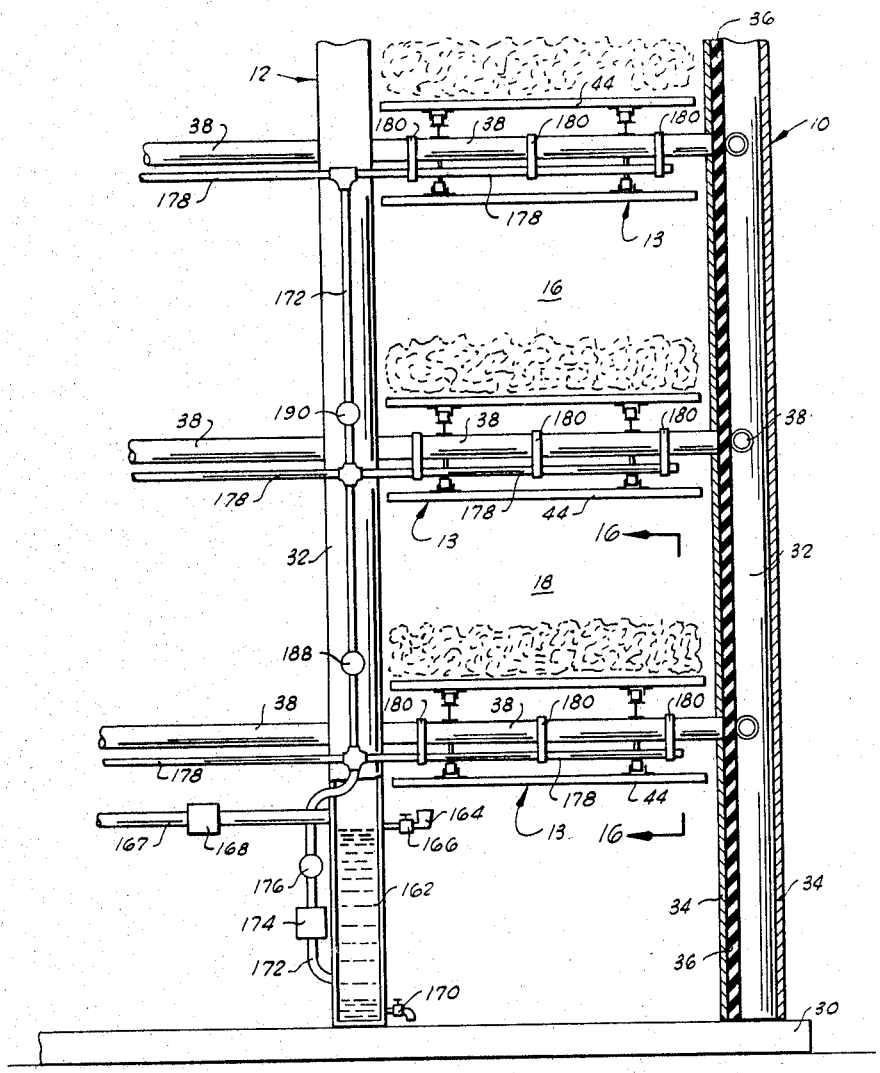
FIGURE 15 is a schematic elevational view of the lubricating system utilized in the compositing plant with portions thereof shown in section.

The housing 10 which encloses the digestion cells comprises certain structural members which are most clearly illustrated in FIGS. 2, 3 and 15. The housing 10 rests upon a concrete base 30 and comprises a plurality of large, vertical, tubular members 32 set in the base 30 and forming the main structural members in the skeleton or framework of the housing. A top or roof is supported by the vertical members 32 and is designated by reference character 33. Any suitable large tubular members may be utilized as the vertical structural elements 32, but I prefer to utilize pipe having an inside diameter of ten inches. In FIG. 2 the side plates of the housing 10 have been removed in order to better illustrate the structural framework of the housing, but in FIG. 3 a section taken through a portion of the side of the housing with the side plates in place is illustrated. It will thus be observed in referring to FIG. 3 that the sides of the housing 10 comprise parallel plates 34 secured to opposite sides of the large vertical tubular member 32 to thus provide a housing having double-walled sides. Although such double-walled construction provides a substantial measure of thermal insulation for the cells disposed within the housing, I prefer to enclose a thick layer of a suitable insulating material 36 between the plates 34 to further improve the insulation afforded by the side walls of the housing 10.

Referring again to FIG. 2, it will be perceived that the large vertical tubular members 32 are joined by horizontally extending smaller tubular members 38 which extend along the sides of the housing 10 and also across its interior. The small tubular members 38 joining the several vertical tubular members 32 to each other are preferably vertically spaced from each other in a manner to permit them to pass between the legs of the several conveyors located within the housing 10 in the manner illustrated in FIG. 15 and hereinafter to be described.

The novel housing thus constructed in accordance with the present invention is highly functional in several respects. As has already been mentioned, the use of tubular members in the structural framework permits the rapid and inexpensive installation of double-walled sides for the housing 10, thus providing a high degree of thermal insulation for the digestion cells located within the housing. Moreover, the tubular members 32 and 38 utilized as structural members are more readily available than conventional structural members such as I-beams, channels and T-bars, and the tubular members require relatively unskilled labor in their erection. Thus, for example, no riveters are required for erecting the framework of the housing 10. Also, the tubular members tend to promote the cleanliness of the composting plant in that they present less surface for the accumulation of dust and refuse, and also do not provide spaces or surfaces for rats and other vermin to run upon, or upon which they may build nests. The use of the depicted network of pipes as structural members further permits such a network to be utilized for fluid flow around and through the several digesters so that temperature of the digesters may be more positively and finely controlled. It may also be desirable to use the structural pipes as conduits for conducting water in heat exchange relation to the refuse in the digestion cells so that the heat generated in the thermophilic process of aerobic bacterial digestion may be utilized for heating the building in which the composting system is located. Alternatively, the conduits may be utilized for carrying electrical leads. Finally, the large vertical tubular members 32 in the structure of the housing provide highly convenient reservoirs for lubricating oil to be utilized in the novel lubricating system of the present invention in a manner hereinafter more fully described.

FIGS. 4 through 9 illustrate the arrangement in the housing 10 of the several endless conveyors 13 utilized in the composting system of the present invention. It will be apparent in referring to these figures that each of the vertically spaced digestion cells 14, 16, 18, 20, 22 and 24 is defined by one of the side walls of the housing 10, the housing partition 12 and an endless conveyor 13 which forms the bottom of each cell. Each of the conveyors 13 comprises endless chains 42, supporting a plurality of spaced slats 44 which extend substantially normal to the direction of movement of the conveyors 13. The detailed construction of the conveyors may best be understood by reference to FIGS. 15 and 16. The conveyors 13 in the tiers of primary and secondary digestion cells are horizontally staggered as shown in FIGS. 5 and 6 so that refuse being moved through one of the cells upon one of the conveyors 13 will fall downwardly onto the next lower conveyor when the refuse reaches the end of the conveyor upon which it is resting.

Located at one end of the primary digestion cells 14, 16 and 18 is a vertically extending elevator shaft 46 which encloses a suitable bucket-type, endless belt elevator 48. An air shaft 50 is disposed between the legs of the elevator 48 and extends from the top to the bottom of the elevator shaft 46. Resting upon the concrete base 30 adjacent the elevator shaft 46 is a grinder 52 which is utilized to reduce the particle size of refuse to be composted. Any suitable grinding device may be employed, but I prefer to utilize a chain grinder.

A conduit 54 is connected at one of its ends to the air shaft 50 and at its other end to the intake end of the grinder 52. A second conduit 56 leads from the discharge end of the grinder 52 to a point beneath the leading end of the conveyor 13 of the lower primary digestion cell 18. Yet another conduit 58 is connected between the air shaft 50 and the second conduit 56, and an air blower 60 is positioned in the conduit 58. The conduits 56 and 58 are provided with check valves 62 and 64, respectively, to prevent the backflow of air therethrough from the primary digestion cells 14, 16 and 18 (see FIG. 5).

An air lock chamber 66 is provided adjacent the upper end of the elevator 48 and extends outwardly for a short distance over the uppermost primary digestion cell 14 in the manner illustrated in FIG. 5. One wall 68 of the air lock 66 extends downwardly past the top 33 of the housing 10 into the digestion cell 14 and functions conjunctively with a leveling screw 70 supported at the lower edge thereof to level the refuse entering the cell 14 in a manner more fully described hereinafter. A short baffle plate 72 extends downwardly and inwardly into the air lock 66 from the top of the elevator shaft 46 to direct refuse from the elevator 48 into the air lock. A pair of pressure switches 74 project into the air lock 66 from the wall of the elevator shaft 46 in a position to be exposed to refuse accumulated in the air lock but shielded from gravitating refuse by the baffle plate 72. A second baffle plate 76 is provided to direct refuse from the air lock 66 onto the conveyor 13 of the top primary digestion cell 14. Similar baffle plates, also designated by reference character 76, are provided in each one of the digestion cells and function in the same manner.

At the end of each of the primary and secondary digestion cells at which the refuse enters the cell, a confining chamber 78 is defined by a pair of opposed vertical walls 80 and 82 which are secured on opposite sides of the respective conveyor 13 to the partition 12 and the adjacent side of the housing 10, respectively (see FIG. 4). The vertical walls 80 and 82 are each offset inwardly from the partition 12 and housing 10, respectively, so that the refuse is initially confined to a smaller space than exists between the side wall of the housing 10 and the partition 12. The purpose of this confinement is explained in the description of the operation of the composting system. In a preferred embodiment of the invention, a plurality of parallel tubular members 84 are secured at one of their ends to the wall of the elevator shaft 46 and extend outwardly over the conveyor 13 of the digester cell 14 for a portion of the length of the cell. The tubular members 84 are closed at their free ends 86 and are characterized by a plurality of perforations 88 adjacent said free ends. A set of identical tubular members 84 is also located over each of the conveyors 13 in the end of the several digestion cells into which the refuse is initially deposited (see FIGS. 5 and 6). A conduit 90 leads from the top of the housing 10 over the primary digestion cell 14 to the air shaft 50 in the elevator 48 and a temperature sensitive element 92 is located in the conduit 90. The temperature sensitive element 92 may be any suitable type of thermostat functioning to generate a signal in response to a predetermined variation in temperature.

Beneath the end of conveyor 13 which moves the refuse through the lowermost primary digestion cell 18, the bypass conveyor 28 enclosed in the bypass conveyor housing 26 extends transversely across the compartment containing the tier of primary digestion cells 14, 16 and 18 and projects at one of its ends 94 over a grinder 96 (see FIGS. 5 and 7). The other end 98 of the bypass conveyor 28 is enclosed in the portion of the bypass conveyor housing 26 which extends beyond the housing 10 of the composting system. The drive system (not shown) for the bypass conveyor 28 is reversible so that the bypass conveyor 28 may be moved in either direction. Thus, refuse which is deposited from the lowest primary digestion cell 18 upon the bypass conveyor 28 may be moved by the bypass conveyor into the grinder 96 or to the opposite end of the bypass conveyor housing 26 where it may be removed through a pivotally hung flap 100. A pair of similar flaps 102 and 104 extend transversely across the bypass conveyor housing 26 even with the side wall of the housing 10, and with the partition 12, respectively, and hang down over the bypass conveyor 28. The flaps 102 and 104 will normally lie on top of refuse being carried by the bypass conveyor 28 and will be in sliding contact with the side walls of the bypass conveyor housing 26 to prevent any appreciable leakage of gas from the bypass conveyor housing, or the intermingling of gases from the primary digestion cells 14, 16 and 18 with those in the secondary digestion cells 20, 22 and 24.

The arrangement of the tier of secondary digestion cells 20, 22 and 24 is similar in many respects to that of the primary digestion cells 14, 16 and 18. One important difference, however, resides in the shorter length of the secondary cells by virtue of the shorter conveyors 13 used therein. The reason the secondary cells are thus constructed is that refuse subjected to aerobic bacterial decomposition undergoes a considerable amount of shrinkage (about 25% in volume in the primary digestion cells) and therefore less volume is required in the secondary cells. Also, uniformity of refuse depth on all the conveyors 13 is thus achieved. In other respects, the secondary digestion cells are generally characterized by the same structural features as are the primary digestion cells. Thus, each of the secondary digestion cells 20, 22 and 24 is characterized by a confining chamber 78 defined by the inwardly offset vertical walls 80 and 82, and is also characterized by the horizontal tubular members 84 projecting out over its respective conveyor 13 in the direction of conveyor travel.

At the end of the housing 10 opposite the elevator 48, a second elevator 106 extends upwardly from the grinder 96 to a point above the level of the top secondary digester cell 20. An air lock chamber 108 similar to the air lock chamber 66 described above is disposed over the end of the secondary digestion cell 20 and refuse is deposited in the air lock chamber 108 from the elevator 106 prior to entering the tier of secondary digestion cells 20, 22 and 24 (see FIGS. 6 and 7). The air lock 108 is characterized by a downwardly depending wall 109 which supports a leveling screw 110 extending transversely across the digestion cell 20. An insulated conduit 111, which is schematically illustrated in FIG. 6, extends from the secondary digestion cell 20 adjacent the air lock 108 into a screen housing subsequently to be described. An air blower 112 rests upon the concrete base 30 under the tier of secondary digestion cells and directs air through a conduit 114 to a point underneath the leading end of the conveyor 13 of the lowermost secondary digestion cell 24.

At the discharge end of the lowermost secondary digestion cell 24, a grinder 116 is positioned under the end of the conveyor 13 to receive the compost as it moves off the end of the conveyor. After a final reduction in the particle size of the compost by the grinder 116, the compost is elevated by an elevator 118 to a screen housing 120 which contains a rotating screen 122 for effecting a final classification of the composted material. The overage from the screen is recycled by suitable means (not shown) to the early stages of the composting system where it serves to inoculate the incoming refuse, and is also then subjected to a second pass through the entire system of digestion cells so that it will undergo further reduction in particle size, and bacterial decomposition in sufficient degree to allow it to pass the screen 122 on its second time through the system. The compost which passes through the screen 122 falls downwardly into a final material hopper 124 from whence it is removed to appropriate bagging machinery by means of an auger type conveyor 126 or other suitable conveyor means. Located on top of the screen housing 120 over the screen 122 is a water bath 128 through which gases from the screen housing may be vented to the atmosphere. A check valve 130 is interposed between the water bath 128 and the interior of the screen housing to control the escape of gases to the atmosphere. A conduit 132 is provided for the purpose of periodically conducting gases from the screen housing 120 to the air shaft 50 in elevator 48 in a manner and for a purpose subsequently to be described. An air blower 134 is interposed in the conduit 132 between the screen housing 120 and the air shaft 50.

OPERATION OF THE PRIMARY AND SECONDARY DIGESTION CELLS AND THEIR ASSOCIATED AERATION SYSTEMS

A better understanding of the process by which organic waste material is converted to a useful compost by the method and apparatus of the present invention may be obtained by referring to FIGS. 17, 18 and 19, which are flow diagrams illustrating the course of the refuse through the composting system, the air circulation system in the primary digestion cells and the air circulation system in the secondary digestion cells, respectively.

The refuse to be composted in the several digestion cells of the composting system of the present invention is first adjusted to a moisture content of approximately 40% to 75% by weight in order to provide the optimum environment, moisture-wise, for the digestive activities of aerobic bacteria. The refuse is then fed to a suitable grinder 52 where it is reduced in particle size. Although any suitable means may be utilized for reducing the particle size of the refuse, I prefer, as I have previously stated, to utilize a chain grinder, since a grinder of this type may be utilized as an important element of the aeration system of the primary digestion cells of the present invention in a manner more fully hereinafter described. Also, the action of the chain grinder upon the refuse is effective to elevate the temperature of the refuse to approximately 78° F.

After the refuse has been reduced in particle size in the manner indicated, it is passed from the grinder 52 to the lower end of the elevator 48 and is carried upwardly by the buckets of the elevator and deposited in the air lock 66. The refuse falls downwardly in the air lock 66 and comes to rest upon the conveyor 13 of the uppermost primary digestion cell 14, where it continues to build up until it has reached sufficient height in the air lock 66 to close the pressure switches 74 located therein. The closure of the pressure switches 74 energizes an electromechanical drive system, which will be subsequently explained in greater detail, which in turn causes the conveyors 13 in each of the digestion cells to commence moving in the direction indicated by the solid arrows (see FIGS. 5 and 6).

While the refuse is resting upon the conveyor 13 in the air lock 66, it is confined between the inwardly offset vertical walls 80 and 82 in the confining chamber 78, previously described. The refuse is thus initially confined to a smaller space on the conveyor 13 than exists between the partition 12 and the adjacent side wall of the housing 10. At this time the refuse also surrounds the tubular members 84 which project outwardly over the conveyor 13 for a substantial distance into the refuse.

With the refuse adjusted to a particle size and moisture content as specified above, the material is characterized by a very substantial agglomerative tendency which enables it to bridge across a large space without benefit of support. Therefore, as the conveyor 13 moves the refuse outwardly from the confining chamber 78 towards the opposite end of the top primary digestion cell 14, the refuse will retain the shape which it has acquired in the confining chamber 78, and a free space will thus exist between the sides of the refuse and the central partition 12 and the adjacent side wall of the housing 10. Moreover, holes which are formed in the refuse by the tubular members 84 will be maintained in the refuse so that the refuse is honeycombed by a plurality of elongated holes extending parallel to the direction of movement of the conveyor 13. Additionally, the friction provided by the inwardly offset vertical walls 80 and 82 on opposite sides of the conveyor 13, in combination with the drag imposed upon the top surface of the refuse by the leveling screw 70, causes the occurrence of a fallback of waste material being moved underneath the leveling screw so that cracks extending normal to the direction of movement of the refuse are formed in the agglomerated bed of refuse. These cracks, designated by reference character C in the drawings, extend vertically downwardly in the bed of refuse and extend substantially from one side of the bed to the other side thereof. By proper adjustment of the depth of refuse in the air lock 66, the speed of the conveyor 13, and the amount of frictional drag imposed by the inwardly offset walls 80 and 82, the cracks may be caused to occur at approximately every two feet along the length of the refuse. These cracks C facilitate a more complete aeration of the refuse and hence vastly improve aerobic bacterial action. The cracks C also provide for a more complete turnover or tumbling action of the refuse as it is passed into the next lower digestion cell 16 in a manner hereinafter described. Conversely, the proper aeration of the refuse during its digestion will aid in suppressing the activity of anaerobic bacteria. As the refuse moves outwardly on the conveyor 13 towards the center of the uppermost primary digestion cell 14, the leveling screw 70 also functions to distribute the refuse in an even manner on the conveyor.

The refuse entering the uppermost primary digestion cell 14 has been warmed some by the grinding action of the chain grinder 52 and therefore enters the digestion cell 14 at an average temperature of approximately 78° F. After the conveyor moves the body of refuse the entire length of the digestion cell 14, the conveyor drive system, explained below, is stopped and the refuse is allowed to remain standing in the cell 14 for a period which, when considered cumulatively with the time required to fill the cell with refuse, amounts to a total time of about 24 hours. During this time the mass of refuse is subjected to intimate contact with circulating air to promote the activity of aerobic bacteria while suppressing the undesirable activity of anaerobic bacteria. A forced air circulation system is utilized to cause the air in the tier of primary digestion cells to circulate through primary digestion cells 14, 16 and 18 at a pressure just slightly above atmospheric pressure in a manner hereinafter more fully described. By virtue of the spaced cracks which are formed in the bed of refuse, and also the honeycombing thereof by the small tubular members 84, the air is allowed to establish intimate contact with the particles of the refuse in the bed as well as upon the top and sides thereof. It will also be noted that the slatted construction of the conveyors 13 permits the beds of refuse in the several cells to be exposed to contact with the circulating air at their lower surfaces as the air passes up through the slats of the conveyors.

During the twenty-four hour period which the refuse is in the uppermost primary digestion cell 14, the temperature of the refuse will rise to from approximately 130° to 145° F., depending upon the ambient air temperature, and since anaerobic bacterial action is suppressed, practically no offensive odors will be released from the cell.

After the refuse has stood quiescently in the cell 14 for a period of from about 18 to about 22 hours, the conveyors 13 are again actuated so that the refuse in the top primary digestion cell 14 is dumped into the next lower primary digestion cell 16. As the refuse falls from the end of the conveyor 13 downwardly into the second primary digestion cell 16, the refuse is turned and broken up to enhance the further aeration of the mass, and also to break up and distribute certain beneficial fungi which have commenced to grow in the mass during its residence in the first primary digestion cell 14. As previously explained, all of the digestion cells, both primary and secondary, are characterized by the confining chambers 78 defined by inwardly offset vertical walls 80 and 82 identical to those in the uppermost primary digestion cell 14, and are also characterized in having the outwardly projecting tubular members 84 which extend into the refuse to provide the honeycombing described above. Therefore, as the refuse from the primary digestion cell 14 falls downwardly into the next lower primary digestion cell 16, the same agglomeration and honeycombing occur which allow the refuse upon the conveyor 13 in cell 16 to be exposed at each of its sides as well as at its top and bottom surfaces, and also to be provided with a plurality of holes extending parallel to the direction of conveyor movement.

When the digestion cell 16 has become filled with the refuse from the uppermost digestion cell 14, the refuse is allowed to occupy the cell 16 for a total period of approximately twenty-four hours to promote further aerobic digestion and beneficial fungus growth. When the refuse in the primary digestion cell 16 is aerated in the manner suggested above, and described in greater detail below, the temperature of the refuse increases to a temperature between approximately 140° and 170° F. during the twenty-four hour period that it occupies the second primary digestion cell 16. At the end of this second twenty-four hour period, the refuse is dumped into the next lower primary cell 18, thus undergoing additional turning and breaking up to further redistribute the beneficial fungi and promote aeration. As it comes to rest upon the conveyor 13 of the digestion cell 18, the refuse is again confined between the inwardly offset walls 80 and 82, and is penetrated by the small tubular members 84. The digestion in the lowermost primary digestion cell 18 is then continued for another twenty-four hour period (including the time required to fill the cell) and is subjected to controlled aeration in substantially the same manner previously described in connection with cells 14 and 16. At the end of this time the refuse has again attained a temperature of between 140° and 170° F.

As has been previously indicated, a forced air circulation system is utilized for aerating the refuse in the tier of primary digestion cells. It is desirable that the magnitude of the force or pressure utilized to produce the desired movement of air through the several primary cells be only sufficiently large to maintain a constant circulation and recirculation in the manner to be described. For this purpose, the chain grinder 52 may be utilized as a blower or air pump, thus conserving electrical power during the times when the grinder is being used to reduce the particle size of refuse being introduced to the primary cells by way of the elevator 48. When the grinder 52 is not in use, the air blower 60 is utilized to provide the necessary air circulation. The air which is discharged from the grinder 52 or air blower 60 is passed through the conduit 56 to a point beneath the end of the conveyor 13 in primary digestion cell 18 which initially receives the downwardly gravitating refuse from the next higher digestion cell 16. In other words, the air is discharged directly underneath the conveyor 13 of the primary digestion cell 18 at the leading end of the conveyor. The main flow path for this air is shown by the dashed line arrows and is indicated as being under the conveyor 13 of the digestion cell 18, over the bypass conveyor 28, back underneath the conveyor 13 of the middle primary digestion cell 16, thence under the conveyor 13 of the top primary digestion cell 14, and finally over the refuse in the top primary digestion cell 14. From the intake end of the uppermost digestion cell 14, the air leaves the digestion cell 14 via the conduit 90 and is passed into the air shaft 50 leading from the top to the bottom of the elevator 48. A conduit 54 is utilized to conduct air from the bottom of the air shaft 50 to the intake end of the grinder 52. Thus, a complete recirculation of the air is provided.

The feature of recirculating air continuously through the primary digestion cells 14, 16 and 18 is believed to be novel with the present invention, and is highly beneficial in that the useful spores and bacteria which would otherwise be lost by air passed through the refuse, but not recirculated, are conserved and effect a partial pre-inoculation of refuse being passed through the grinder 52 on its way to the uppermost primary digestion cell 14. The recirculation of the air through the primary digestion cells 12, 14 and 16 also conserves the gases generated by bacterial activity in these cells and provides a highly beneficial blending of these gases throughout the several cells to promote an even carbon-to-nitrogen ratio in the entire body of refuse. In other words, one portion of the refuse may be giving off a completely different gas than some other portion of the refuse. The blending of these gases and the recirculation thereof through all portions of the refuse will promote a more even carbon-to-nitrogen ratio for the beds of refuse in all three of the primary digestion cells. Finally, the continuous recirculation of air through the three primary digestion cells is a highly useful procedure from the standpoint of heat conservation. The heat generated by the thermophilic action of aerobic bacteria is sufficient, as indicated above, to considerably elevate the temperatures prevailing in the several primary digestion cells. The recirculation of air through these cells serves to effect some heat transfer from the cells to the grinder 52, thus accomplishing some preheating of the refuse as it passes through the grinder and also preventing any possibility of cool air, which is quite detrimental to aerobic bacterial activity, from being introduced to the cells as might be the case in a one-pass aeration system.

After a twenty-four hour period of digestion in the lowermost digestion cell 18, the refuse is moved by the conveyor 13 out of the digestion cell 18 and is allowed to gravitate onto the bypass conveyor 28 which extends normal to the digestion cell 18 across one end of the housing 10. As has been previously indicated, the bypass conveyor 28 and its enclosing housing 26 are provided with appropriate pivotally-hung flaps 102 and 104 for the purpose of preventing the loss of air from the tier of primary digestion cells. Thus, the beneficial recirculation of air which has been described above is not interrupted by the discharge of refuse from the lowermost primary digestion cell 18 onto the bypass conveyor 28.

In the normal operation of the composting system of the present invention, the refuse will be retained on each of the primary digestion cell conveyors 13 for a period of approximately twenty-four hours and is then dumped onto the next lower conveyor so that a three-day cycle of composting obtains in the three primary digestion cells 14, 16 and 18. During the three-day primary digestion cycle, the volume of the refuse being composted will be reduced by approximately 25% as a result of the bacterial decomposition, and by virtue of the employment of optimum aeration conditions, the temperature of material will have exceeded the pasteurization temperature, thus destroying all pathogens in the material and substantially entirely suppressing the activity of anaerobic bacteria. Thus, all harmful organisms in the waste material will have been effectively destroyed, and the material which is fed from the lowermost primary digestion cell 18 to the bypass conveyor 28 may optionally be removed from the digestion system and safely utilized in a landfill operation. If it should be desired to so utilize the partially composted refuse, the bypass conveyor 28 may be moved in a direction to carry the refuse into the offset portion of the bypass conveyor housing 26. The refuse can then conveniently be discharged from the bypass conveyor housing 26 through the pivotally-hung flap 100 in the side of the housing, as shown in FIG. 7, or any other suitable means may be utilized for removing the partially composted refuse from the housing 26.

Usually, however, it will be desired to continue the composting operation and, in such event, the partially composted refuse which has passed through the primary cells 14, 16 and 18 is conveyed by the bypass conveyor 28 into a second grinder 96, preferably of the chain grinder type, where the refuse is further reduced in particle size. After being thoroughly comminuted by the chains of the grinder 96, the refuse is discharged by the grinder to the elevator 106 and is lifted upwardly and deposited in the air lock 108 over the intake end of the uppermost secondary digestion cell 20. The confinement and honeycombing of the refuse in the secondary digestion cell 20 occurs in the same manner, and by virtue of the utilization of substantially identical apparatus as that which has been explained in connection with the primary digestion cells. Thus, the transverse cracks and elongated holes which have been described as characterizing the refuse in the uppermost primary digestion cell 14 are also present in the agglomerated bed of refuse resting upon the conveyor 13 of the uppermost secondary digestion cell 20.

The course of the refuse through the tier of secondary digestion cells 20, 22 and 24 is substantially identical to the course which it follows through the tier of primary digestion cells 14, 16 and 18 with the refuse occupying each of the secondary cells for a total period of approximately twenty-four hours. The temperatures attained by the partially composted refuse in the three secondary cells are as follows: (a) maximum temperature attained in cell 20, from approximately 120° F. to 150° F.; (b) maximum temperature attained in cell 22, from approximately 110° F. to 140° F.; (c) maximum temperature attained in cell 24, from approximately 100° F. to 130° F. Because of the variation in conditions which are required in the secondary composting cycle from those which are required in the primary digestion cells, a different air circulatory system is employed in conjunction with the secondary cells than is employed in the case of the primary cells. Thus, a separate air blower 112 is utilized for the secondary cells 20, 22 and 24 and is located underneath the lowermost secondary cell 24 in a position to draw air from the compartment of the housing 10 which encloses the secondary cells so that the spores and bacteria which are present in the air in this compartment of the housing may be conserved. The induction of air from within the housing 10 by the blower 112 prevents the refuse in the secondary digestion cells 20, 22 and 24 from being exposed to cool air which, as has been pointed out, is quite detrimental to beneficial aerobic bacterial action. The air which is inducted by the blower 112 from the housing 10 is directed through the conduit 114 to a point beneath the leading end of the conveyor 13 in the lowermost secondary digestion cell 24. From this point, the main air flow through the secondary cells is underneath the conveyor 13 of cell 24, then upwardly underneath the conveyors of cells 20 and 22, and finally up over the refuse contained within the uppermost digestion cell 20. Air reaching the intake end of the uppermost secondary digestion cell 20 is then passed through the insulated conduit 111 to the screen housing 120 and enters the screen housing at a point beneath the screen 122. In the screen housing 120, the air which has been circluated through the secondary digestion cells 20, 22 and 24 is allowed to pass upwardly through the screen 122, thus picking up some of the beneficial bacteria and spores in the final compost.

The temperature of the gases in the top of the screen housing 120 will ordinarily be between approximately 110° F. and 150° F. Thus, this air is substantially warmer than atmospheric air surrounding the housing 10, but is slightly cooler than the maximum temperatures obtained in the primary digestion cells 14, 16 and 18. Air and gases from the screen housing 120 may therefore be utilized to maintain the air which is recirculated in the primary digestion cells 14, 16 and 18 below a maximum temperature of about 168° F., above which the activity of the aerobic bacteria commences to decline and, at the same time, the introduction of undesirably cool gas to the primary cells is avoided. For the purpose of conducting air from the screen housing 120 to the recirculating air in the primary digestion cells 14, 16 and 18, the conduit 132 is provided which leads from the top of the screen housing 120 into the conduit 90 which conducts the recirculating air from the uppermost primary cell 14 to the air shaft 50 in the elevator 48. A suitable blower 134 is provided in the conduit 121 and is electrically connected to the temperature sensitive element 92 in the conduit 90 so that when the temperature in primary digestion cell 14 reaches approximately 168° F., the temperature sensing element 92 which is exposed to the air recirculated through the primary cells will actuate the blower in the conduit 121 to supply air of lower temperature from the screen housing 120 to the recirculating air. In this manner, the refuse being composted in the primary cells 14, 16 and 18, and particularly in the lowermost primary cell 18, is not subjected to a cold blast of air as would be the case if atmospheric air were utilized. Furthermore, the drawing of make-up air from the screen housing 120 conserves bacteria and spores in the gases produced by the digestive processes occurring in the secondary cells and recirculates the bacteria and spores through the primary cells. At such times as the temperature of the gases circulated through the primary digestion cells is sufficiently low that no make-up air from the screen housing 120 is required, the air and gases accumulating in the screen housing may be discharged to the atmosphere through a suitable water wash 128. The water wash is operative to remove spores and bacteria in the discharging gases so that atmospheric pollution problems are avoided.

In addition to the main course of the air which is circulated to the secondary digestion cells 20, 22 and 24 as described above, a small portion of the air being forced through the secondary digestion cells will be diffused upwardly through the slats 44 of each of the conveyors 13 and through the refuse being supported on the respective conveyors so that completely aerobic conditions are maintained in the refuse in each of the secondary digestion cells. It should also be noted that since only fresh air is forced through the secondary digestion cells 20, 22 and 24, the refuse being supported on the respective conveyors 13 therein will be dried to facilitate the complete digestion of the refuse and also to bring the moisture content of the final product to the desired level for bacterial stabilization.

In the air circulating system utilized in both the primary and secondary cells, it is desirable that only a sufficient pressure be imposed upon the air by the blowers and the grinder 52 which serves as a blower to cause the air to move in the direction indicated above. This pressure need only be very slightly above atmospheric, and it has been found that ordinarily a pressure of 0.5 p.s.i.g. is entirely adequate.

As has been previously indicated, the recirculation of gases in the primary digestion cells 14, 16 and 18 of the composting system is an important feature of the present invention in that such recirculation promotes the blending of all gases given off by the digestion processes occurring in the primary cells and thus promotes the even distribution of the carbon-to-nitrogen ratio throughout the entire refuse therein. The utilization of make-up air from the screen housing 120 is effective to obtain optimum temperature conditions in the primary cells 14, 16 and 18 for aerobic bacterial activity. It also allows beneficial bacteria and spores from the final product in the screen 122 and also in the secondary digestion cells 20, 22 and 24 to be conserved. The recirculatory system of the primary digestion cells requires minimum power for its operation since it is possible to utilize the grinder 52 as a blower. The auxiliary blower 60 need be utilized only when the grinder 52 is not in use. Drying and cooling in the secondary digestion cells is effectively accomplished by using only fresh air rather than recirculated gases in aerating the refuse in these cells. Process-wise, the concept of recirculating evolved gases in the initial stages of the composting process, while circulating only fresh air through the later stages of the process is believed to be a novel and highly beneficial operation. Finally, a completely sanitary composting system is obtained since all gases vented from the digestion cells are passed through a water wash prior to their discharge to the atmosphere so that substantially all bacteria and spores entrained in such gases are removed.

In the completion of the composing operation, the stabilized compost in the lowermost secondary digestion cell 24 is discharged from the end of the conveyor 13 in that cell to a grinder 116 where a final reduction in particle size takes place. The compost is then lifted to the final screen housing 120 by means of the elevator 118 and a final classification of the compost according to particle size is effected. The overage from the screen 122 is recycled to an early stage of the composting operation in the manner previously described, and the material which passes through the screen is transported by the conveyor 126 to suitable bagging facilities.

In the case of some types of refuse, optimum composting conditions are obtained by slightly rearranging the location of the digestion cells and chain grinders in the manner shown in the flow diagram illustrated in FIG. 20. The refuse is first reduced in particle size by the grinder 52 and is then passed through the air lock 66 into a first primary digestion cell 200 where it remains for a total period of about twenty-four hours undergoing aerobic bacterial decomposition. It is then gravitated into a second digestion cell 202 and remains there for an additional twenty-four hours. The partially composted refuse is then further reduced in particle size by a grinder 204 prior to its introduction to a tier of four secondary cells 208, 210, 212 and 214 through an air lock 206.

After remaining about twenty-four hours in each of the secondary digestion cells, the refuse is transferred without further grinding to the screen 122 for final classification.

I have also found that an improvement in the aeration of the refuse may be effected if triangular plates 216 are utilized in each of the digestion cells as shown in FIG. 21. The plates 216 are right triangular in configuration and are secured to the walls of the housing 10 at the end of each cell into which the refuse is first introduced. The plates function to produce clefts or fissures in the agglomerated refuse material, and offer some advantage in this respect over the tubular members 84 depicted in FIGS. 4, 5 and 6, since the fissures are open at the bottom of the bed of refuse, thus allowing air which percolates upwardly through the slatted conveyors to more easily penetrate the refuse. However, the triangular plates are not as well adapted as the tubular members 84 to facilitate the introduction of steam or air into the body of the material, since the latter elements are hollow and are provided with apertures at their ends located in the refuse. Of course, both these elements, the triangular plates 216 and the tubular members 84, may be used concurrently to good advantage.

At this point it should be pointed out that although the hereinbefore described construction of digestion cell 14 constitutes a preferred apparatus for forming the elongated cracks which extend substantially from side to side of the bed of refuse, other apparatus can also be used for this purpose. For example, a vertically reciprocating blade 250 of the type shown in FIGURE 22 can be driven into the bed of refuse by a pneumatic ram 252 or other suitable drive mechanism to form the vertical cracks which extend transversely across the refuse. The motion of the blade 250 is timed to provide a spacing of approximately two feet between cracks.

CONVEYOR DRIVE SYSTEM

The system used to drive the conveyors 13 of the composting system is illustrated in FIGS. 10-14. A drive motor 138 resting upon the concrete base 30 of the housing 10 directly drives the conveyors 13 of the primary cells 14, 16 and 18 through a heavy chain 140 which passes over drive sprockets 142 carried by the drive rollers 144, and also over sprocket 146 carried by the idler roller 148.

The shorter conveyors 13 of the secondary cells 20, 22 and 24 are indirectly driven by the motor 138 through the medium of a jack shaft 150 and a second heavy chain 152. The relative arrangement of motor 138, jack shaft 150 and drive chains 152 and 140 may best be understood by referring to the schematic plan view of the drive system shown in FIG. 14. The drive chain 152 to the secondary cell conveyors 13, similarly to the drive chain 140 to the primary cell conveyors, passes over drive sprockets 154 and idler sprockets 156 carried by drive rollers 158 and idler rollers 160, respectively. The chains 152 and 140 rotate the several drive sprockets in the proper direction to move the conveyors 13 in the direction indicated by the solid line arrows in FIGS. 10 and 11, that is, with the top and bottom conveyors in each tier moving in the same direction, and the central conveyors moving in a direction opposite to the direction of movement of the top and bottom conveyors. The electrical circuit to the drive motor 138 is electrically connected to the pressure switches 74 located in the air lock 66 at the entrance to the uppermost primary cell 14 so that the circuit is closed when refuse to be composted reaches the level of the pressure switches. Thus, when both of the pressure switches 74 are covered by waste material, the drive motor is energized and remains energized until both pressure switches are opened by being uncovered as the waste material is moved out of the air lock 66 upon the conveyor 13 of primary digestion cell 14.

LUBRICATION SYSTEM

Figure 16:
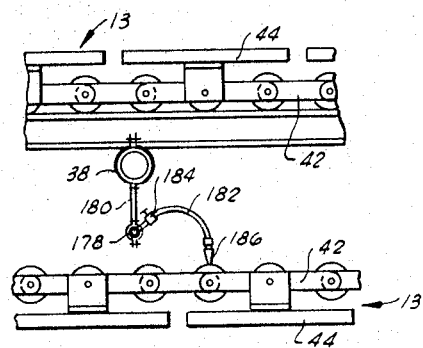
FIGURE 16 is a view in section taken substantially along line 16—16 of FIG. 15.

The lubrication system of the present invention is illustrated in FIGS. 15 and 16. A supply of suitable lubricant 162 is located in the bottom of one or more of the large tubular vertical structural members 32. The tubular vertical structural members 32 used as lubricant reservoirs are preferably located in the central partition 12 of the housing 10. The lubricant is fed to the lower ends of the large tubular members 32 by means of a suitable filler funnel 164 and petcock 166. The tubular members 32 which are used as lubricant reservoirs are sealed at their upper ends so that air may be maintained under pressure in the tubular members over the lubricant. The air is introduced to the tubular members 32 by way of an air conduit 167 fitted with a suitable air pressure regulator 168 capable of reducing the 70 p.s.i.g. pressure normally utilized as plant pressure to 15 p.s.i.g. A drain valve 170 is provided at the lower end of the large tubular members 32 which contain the lubricant so that sediment settling out of the lubricant may be periodically removed by simply opening the drain valve. The air pressure above the lubricant will blow this sediment out and facilitate the maintenance of clean lubricant in the reservoir.

A central distribution conduit 172 communicates with the interior of each of the lubricant-containing tubular members 32 at a point near the lower end thereof, and extends upwardly along its respective tubular member. A suitable filter 174 and a solenoid valve 176 are interposed in each of the central distribution conduits 172 near its point of connection to the lubricant reservoir 162. The solenoid valve 176 is electrically connected to the conveyor drive system so that lubricant is permitted to pass upwardly in the central distribution conduit 172 when the conveyor drive system is energized. A plurality of small pipes 178 extend horizontally outwardly from the central distribution conduit at each conveyor level and each pipe 178 passes between the upper and lower legs of the adjacent conveyor 13 (see FIGS. 15 and 16). Each of the pipes 178 is closed at its free end, that is, its end not connected to the central distribution conduit 172, and is suspended from the nearest adjacent horizontal tubular structural member 38 by suitable straps 180. Sections of small copper tubing 182 are connected to the pipes 178 at the chains 42 of each conveyor 13. A petcock 184 is interposed in each copper tubing section 182 adjacent the respective pipe 178, and a nozzle 186 is provided on the outer end of each copper tubing section 182 in a position immediately above the lower portion of the respective conveyor chain 42.

As has been indicated above, the energization of the conveyor drive motor 138 is also effective to energize the solenoid valve 176 in the central distribution conduit 172, thereby opening the valve 176 and allowing lubricant to be forced by the air pressure in the vertical tubular member 32 upwardly into the central distribution conduit 172. As the lubricant moves upwardly in the central distribution conduit 172, it is filtered by the filter 174 and then moves outwardly into the horizontal pipes 178. The lubricant then drips through each of the nozzles 186 onto the respective conveyor chain at a speed depending upon the size of the respective nozzle, the degree of closure of the respective petcock 184, and the air pressure applied to the lubricant. If the lubricant drips too fast, the petcock 184 in the respective copper tubing 182 may be partially closed. It will be noted that check valves 188 and 190 are interposed in the central distribution conduit 172 above the lower and intermediate levels of the horizontal pipes 178 to prevent a drainage of the lubricant from the uppermost pipes 178 downwardly and out through the lower pipes. The upper check valve 190 will prevent lubricant from draining from the upper pipes 178 through the central and bottom pipes 178, and the lower check valve 188 will prevent lubricant from draining from the centrally located pipes 178 through the lower pipes. Therefore, all of the horizontally extending pipes 178 branching off the central distribution conduit 172 will be full of lubricant when the conveyors 13 are placed in operation to provide a minimum time delay between the starting of operation of the conveyors and the initiation of lubrication.

A number of distinct advantages accrue from the use of the novel lubricating system of the present invention. By virtue of the location of the several lubricant conduits in close proximity to the composting refuse, the heat generated in the bacterial digestion process is effective to warm the lubricating oil to prevent its becoming undesirably viscous. The air pressure acting upon the lubricant provides a positive feed of the oil to the nozzles 186 so that a gravity feed is not required at any point. Also, the system is adaptable to different viscosities of lubricant, since flow rate may be controlled over a wide range. Lubricant is supplied to the conveyors 13 only when it is needed, that is, when the conveyors are in operation.

It will be apparent that branch conduits from the central distribution conduit 172 may also be utilized to provide a supply of lubricating oil to the drive chains 140 and 152 used to drive the conveyors 13 of the primary and secondary digestion cells.

From the foregoing discussion of the invention and the description of the operation of the parts thereof, it will be manifest that the composting apparatus and method of the invention present a very economical and safe method of rapidly and efficiently disposing of organic waste material, and particularly municipal refuse. Substantial economies are effected by the novel design of the digestion cell housing and the utilization of certain components of the composting system to perform a dual function. The provision which is made in the system for obtaining thorough aeration and temperature control of the refuse in the several digestion cells results in the effective suppression of substantially all anaerobic bacterial activity so that no obnoxious odors are evolved from the decomposing refuse. Moreover, the two-stage, six-day digestion process permits the refuse to be completely converted to a stable and highly useful compost in a minimum of time so that the entire refuse output of large municipalities may be profitably processed in the composting system of the invention.

Changes may be made in the combination and arrangement of parts and elements of the composting system and in the steps of the process set forth in the specifications and shown in the drawings without departing from the spirit and scope of the invention as defined in the following claims.

I claim:

1. In a process of decomposing waste organic material by subjecting the waste material to aerobic bacterial digestion while moving the waste material horizontally in generally rectangularly cross sectioned beds; the improvement which comprises forming cracks in said beds extending across the entire width of said beds normal to the direction of movement of said beds and extending from the upper surface of said beds downwardly toward the bottom of said beds while preserving the general rectangularly cross sectioned configuration of said beds, whereby efficient and rapid aerobic bacterial digestion may be promoted by subjecting the beds to controlled aeration by passing air through said cracks and around said beds.

2. In a process of decomposing organic waste material by subjecting the waste material to aerobic bacterial digestion while moving the waste material horizontally in generally rectangularly cross sectioned beds, the improvement which comprises forming parallel, spaced cracks in said beds extending across the entire width of said beds normal to the direction of movement of said beds and extending from the upper surface of said beds downwardly toward the bottom of said beds while preserving the general rectangularly cross sectioned configuration of such beds; and circulating air containing beneficial bacteria and spores through and over said cracked beds while maintaining the temperature in said beds at less than approximately 170° F., whereby optimum conditions for aerobic bacterial digestion may be established.

3. In a method of composting organic waste material which comprises the steps of comminuting the waste material to be composted; laterally confining the comminuted waste material to promote the lateral agglomeration of particles of said comminuted refuse and form said comminuted refuse into a generally rectangularly cross sectioned configuration; moving the comminuted waste material in a direction parallel to the confined sides thereof and simultaneously imposing a drag on the external surfaces of said moving comminuted refuse sufficient to cause said comminuted refuse to develop generally parallel, spaced vertical cracks therein extending substantially transversely to the direction of movement of said comminuted refuse; freeing said comminuted refuse from lateral confinement to provide a space at the sides of said comminuted refuse; then subjecting the comminuted refuse to controlled aerobic bacterial digestion while minimizing anaerobic bacterial activity until the heat of digestion raises the temperature above about 140° F. whereby substantially all of the pathogens in said comminuted refuse are destroyed.

4. In a method of composting organic waste material which comprises the steps of grinding the mass of waste material to reduce the particle size thereof; laterally confining said mass to promote the lateral agglomeration of the particles of said mass and form said mass in a generally rectangularly cross sectioned configuration; moving the mass in a direction parallel to the confining sides of the mass while imposing a drag on the external surfaces of the mass sufficient to cause said mass to develop spaced, parallel vertical cracks therein extending substantially transversely to the direction of movement of said mass; freeing the mass from lateral confinement to provide a a space at the sides of the mass; aerating the mass to promote thermophilic aerobic bacterial action in the mass while maintaining the temperature of the mass below approximately 170° F.; and periodically turning the mass during said aeration to promote growth of beneficial spores and fungi in the mass.

5. The method of composting organic waste material which comprises the steps of grinding the mass of waste material to reduce the particle size thereof; laterally confining the mass of waste material to allow said mass to agglomerate laterally and to form said mass in the general shape of a right rectangle; moving the mass in a direction parallel to the confined sides thereof while imposing a drag on the external surfaces of said mass sufficient to cause said mass to develop parallel, spaced, vertical cracks therein extending substantially transversely to the direction of movement of said mass; freeing the mass from lateral confinement; subjecting the mass to controlled aerobic bacterial digestion while minimizing anaerobic bacterial activity until the temperature of the mass exceeds about 140° F.; regrinding the mass to reduce the particle size thereof to a size less than the particle size at the end of the initial grinding step; and then again subjecting the mass to controlled aerobic bacterial action until the temperature has again exceeded about 140° F.

6. The method of composting waste organic material as claimed in claim 5 wherein the mass is moistened to a moisture content of approximately 40% to 75% by weight prior to the initial controlled aerobic bacterial digestion.

7. The method of composting waste organic material as claimed in claim 5 and further characterized to include the step of honeycombing said mass with a plurality of parallel holes extending normal to said vertical cracks and parallel to the direction of movement of said mass prior to subjecting the mass to controlled aerobic bacterial digestion.

8. The method of composting waste organic material as claimed in claim 5 wherein the step of initially subjecting the mass to controlled aerobic bacterial digestion comprises circulating air through the vertical cracks in said mass, between the particles of said mass, around the lateral sides of said mass, and over said mass; continually recirculating the air initially circulated through, around and over said mass while maintaining the temperature of said recirculated air at less than approximately 168° F.; and periodically turning said mass while subjecting the mass to said recirculated air at a temperature of less than approximately 168° F.

9. The method of composting organic waste material as claimed in claim 8 wherein the turning of said mass is effected every twenty-four hours for seventy-two hours.

10. The method of composting organic waste material as claimed in claim 5 wherein the step of again subjecting the mass to controlled aerobic bacterial action comprises circulating warm, fresh air through and around said mass and periodically turning said mass while subjecting the mass to contact with said warm, fresh air.

11. The method of composting organic waste material which comprises reducing the particle size of said material; adjusting the moisture content of said material to between approximately 40% and 75% by weight; moving said material downwardly and then horizontally into a first bed to form spaced, vertical cracks in said material extending transversely across the bed; forming parallel holes extending substantially normal to said cracks; passing air around and through said bed to extract a portion of the heat generated by aerobic bacteria in said waste material; continuously recirculating said heated air around and through said material while maintaining the temperature of said recirculated air below approximately 168° F.; disintegrating said first bed by turning and agitating said material after the temperature of said first bed has exceeded approximately 130° F.; forming said material in a second bed similar to said first bed; subjecting said second bed to thorough contact with said recirculated air; disintegrating said second bed by turning and agitating said material after the temperature of said second bed has exceeded approximately 140° F.; forming said material in a third bed similar to said first and second beds; subjecting said third bed to thorough contact with said recirculated air; disintegrating said third bed by turning and agitating said material after the temperature of said third bed has exceeded approximately 140° F.; further reducing the particle size of said waste material; forming said material in a fourth bed similar to said first bed; continuously circulating fresh, warm air around and through said fourth bed; disintegrating said fourth bed by turning and agitating said material after the temperature of said fourth bed has exceeded approximately 120° F.; forming said material in a fifth bed similar to said first bed; subjecting said fifth bed to contact with continuously circulated fresh, warm air; disintegrating said fifth bed by turning and agitating said material after temperature of said fifth bed has exceeded approximately 110° F.; forming said material in a sixth bed similar to said first bed; subjecting said sixth bed to contact with fresh, warm air; disintegrating said sixth bed; further reducing the particle size of said material; and screening said material to effect a final classification of the compost thus produced according to particle size.

12. In a process of decomposing waste organic material by subjecting the waste material to aerobic bacterial digestion while moving the waste material horizontally in generally rectangularly cross sectioned beds; the improvement which comprises moving the waste material in a downward direction and then in a horizontal direction into one end of each of the horizontal beds to form parallel, spaced cracks in said beds extending across the entire width of said beds normal to the direction of movement of said beds and extending from the upper surface of said beds downwardly toward the bottom of said beds while preserving the general rectangularly cross sectioned configuration of said beds, whereby efficient and rapid aerobic bacterial digestion may be promoted by subjecting the beds to controlled aeration by passing air through said cracks and around said beds.

13. In a process of decomposing organic waste material as defined in claim 12 characterized further to include confining the opposite sides of said beds while the waste material is being moved downwardly and horizontally into the beds.

References Cited by the Examiner

UNITED STATES PATENTS

| | | | |
|---|---|---|---|
| 1,456,332 | 5/1923 | Nash | 71—9 |
| 1,919,836 | 7/1933 | Goldsborough | 71—9 |
| 2,043,625 | 6/1936 | Roeder | 71—9 |
| 2,337,686 | 12/1943 | Sherman | 71—8 |
| 2,867,521 | 1/1959 | Jeffreys | 71—8 |
| 3,114,622 | 12/1963 | Hardy | 71—9 |

DONALL H. SYLVESTER, *Primary Examiner.*

G. W. RUTHERFORD, *Assistant Examiner.*